March 27, 1928.

C. E. PALMER

CARBURETOR

Original Filed Feb. 16, 1924

1,663,724

WITNESSES
Edw. Thorpe

INVENTOR
Charles E. Palmer
BY
ATTORNEYS

Patented Mar. 27, 1928.

1,663,724

UNITED STATES PATENT OFFICE.

CHARLES EDWARD PALMER, OF MARSHFIELD, OREGON, ASSIGNOR TO JOHN OZEK, OF MARSHFIELD, OREGON.

CARBURETOR.

Application filed February 16, 1924, Serial No. 693,320. Renewed February 15, 1928.

This invention relates to carburetors for use with internal combustion engines and has for its object the provision of a device which is capable not only of forming an economical combustible mixture with air and gasoline, but the heavier fuels may be employed with equal advantage.

Another object of the invention is the provision of a carburetor in which the primary air is supplied in cylindrical formation upon both sides of an annular valve controlled fuel nozzle and secondary air is furnished to the primary air and fuel at a point beyond and centrally of the said air and fuel supply.

A further object of the invention is the provision of a device providing a divisional flow of primary air upon opposite sides of a fuel nozzle with a secondary air supply directed into the fuel and air supply beyond the fuel supply, the secondary air supply being tapped from the primary air supply, and the point of admission of the secondary air supply to the primary air and fuel supply being advanced towards or away from the point of injection of the fuel into the primary air.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

Figure 1:
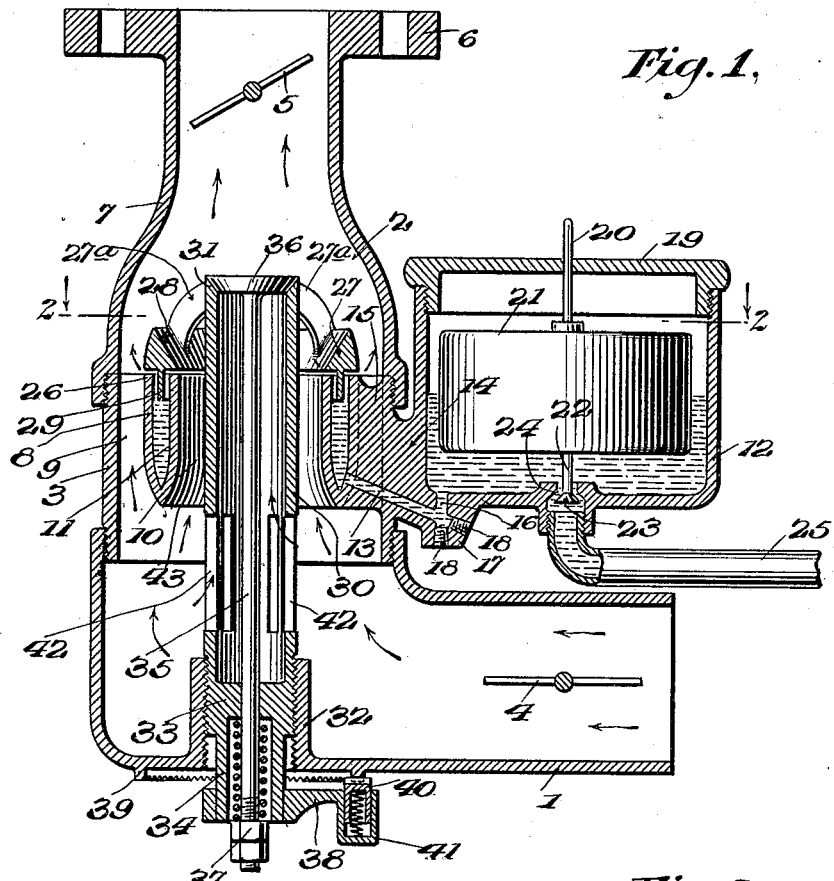
Figure 1 is a vertical section of a carburetor constructed in accordance with the principles of my invention.
Figure 2:
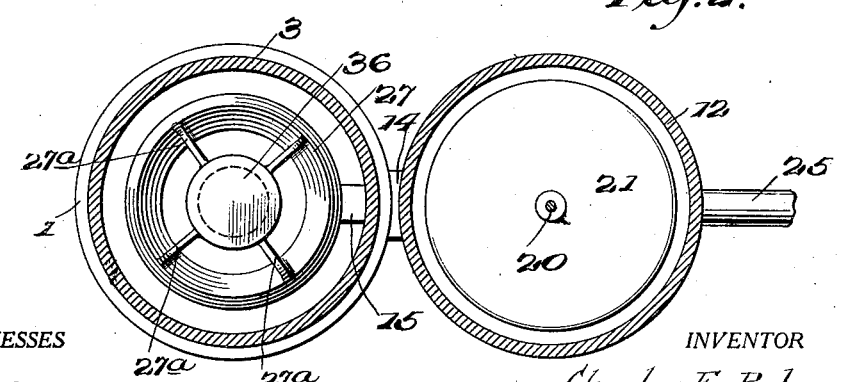
Figure 2 is a horizontal section taken along the line 2—2 of Figure 1.

Referring more particularly to the drawings, 1 designates a primary air conduit connected to a mixing chamber 2 by a body member 3, the opposite ends of the body member being threaded into the threaded alined ends of the air conduit and the mixing tube or chamber. The air conduit 1 is equipped with a choke valve 4 while the mixing tube is provided with a throttle valve 5. The mixing tube is provided with the usual perforated flange 6 for connection to the intake manifold of an engine. The mixing tube is reduced at its upper end to form a restricted passage as shown at 7.

An annular channel member 8 is mounted centrally of and spaced from the inner wall of the body member 3 thereby providing a cylindrical primary air passage 9 between the channel member and the body and thus connecting the air conduit 1 with the mixing tube 3. The central section of the channel member being hollow likewise forms a passage 10 between the air conduit and the mixing tube.

The channel 11 in the member 8 provides an annular fuel chamber which is in communication with a float chamber 12 by means of a conduit 13 formed in the integral connection 14 between the float chamber and the body member. The conduit 13 is continued through the rib 15 which supports the channel member 8 centrally of the body member. The conduit 13, as well as a short conduit 16 leading to the float chamber 12 from channel 13, open through a boss 17 at the bottom of the float chamber to the atmosphere and are closed by plugs 18. By the removal of the plugs the fuel chamber 11 and the float chamber may be drained of their contents for the discharge of sediment.

The float chamber is provided with a removable closure 19 which has a central perforation forming a bearing for the guide stem 20 connected with the float 21. A valve stem 22 secured to the bottom of the float carries a valve 23 for controlling the flow of fuel through a port 24 connecting the fuel supply pipe 25 with the float chamber.

The annular channel member 8 is open at its top, as shown at 26, and provided with a seat upon which is mounted an annular valve 27 having a flared portion 28 and an annular depending flange 29 located with the top of the fuel chamber 11 for equalizing the flow of gas from the chamber 8. The flange is of less width than the chamber whereby fuel may be drawn upwardly upon opposite sides of the flange and sprayed into the incoming air upon opposite sides of the channel member 8. The outer wall adjacent the lower end of the channel member 8 is flared inwardly toward the outwardly flared inner wall of said channel member thereby providing venturis at this point for the primary air currents passing through and around the channel member 8.

An auxiliary air conduit 30 is projected centrally through the passage 10 of the channel member 8 and terminates in a valve seat 31 at a point beyond the upper end of the annular valve 27. Ribs 27ª connect valve 27 with the conduit 30. The lower end of the conduit is threaded externally and screwed into an internally threaded boss 32 formed on the bottom of the primary air conduit 1. The lower end of the auxiliary air conduit where screwed into the boss is closed by an integral formation 33, beyond which a hollow extension 34 projects through an opening in the bottom of the primary air conduit.

A valve stem 35 is mounted in a bearing in the integral formation 33 and carries a valve 36 at its upper end adapted to normally rest on the seat 31 at the upper end of the auxiliary air conduit 30. The lower end of the stem passes through the hollow extension 34 and is embraced by a coil spring seated in the said hollow extension. The spring bears at one end upon the bottom of the recess in the extension and at its other end against nuts 37, screwed on the lower threaded end of the stem. The adjustment of the nuts varies the tension of the spring and thereby varying the control of the opening of the valve 36.

An operating arm 38 is secured to the projecting end of the extension 34 for rotating the conduit 30 and thus lowering or elevating the valve 27 relative to the opening 26 and thus regulating the fuel nozzle formed by the valve 27 and the top of the chamber 8.

An annular rib 39 formed on the bottom of the primary air conduit 1 and surrounding the projecting end of the conduit 30 is provided with teeth adapted to be engaged by a spring pressed pawl 40 for maintaining the vertical adjustment of the tube 30. The pawl is mounted in a barrel 41 formed on the end of the lever 38.

The tube 30 is slotted at 42 to admit air from the conduit 1 to the auxiliary air conduit 30 in quantities in proportion to the opening of the valve 36.

The operation of my device is as follows:

Primary air is admitted through conduit 1 past the choke valve 4 which controls the flow of both primary and auxiliary air to the mixing chamber. Primary air is split at 43 into two cylindrical streams. One stream passing through the outer channel 9 in the body member and the other stream passing through the inner channel 10 of the member 8. The pressure at 43 due to the venturis at this point increases the velocity of the air passing through said channels. The fuel issuing from the annular nozzle at the mouth of the fuel chamber is projected directly into the two streams of air upon opposite sides of the valve 37 thereby creating a very intimate mixture of air and fuel.

The cylindrical stream of air through channel 10 is slightly retarded at the flared portion 28 of the valve 27 due to a small degree of expansion when the inner mixture passes the flared portion and the upper end of valve 27 and the inner mixture is then directed outwardly towards the outer stream of air and fuel which is directed inwardly by the bowed inward portion 7 of the mixing tube 2.

When the negative pressure in the mixing tube is sufficient by reason of the increased opening of the throttle valve 5 and the increased speed of the engine to which the carburetor has been attached, the valve 36 opens against the tension of the spring at the bottom of the valve stem 35 and supplies the mixing chamber with additional air beyond the valve 27. By lowering the tube 30 through the rotation of the lever 38 the supply of fuel is decreased while elevating the tube by a reverse operation of the lever increases the supply of fuel.

An adjustment of the upper end of the tube 30 may be made which will be practical for general purposes.

An operating rod may be connected to the lever 38 and directed to the dash of an automobile if desired for adjusting the fuel as the occasion may require. By regulating the nuts 37 the flow of auxiliary air from the conduit 30 is controlled.

While the engine is running normally the auxiliary air valve is closed but on opening up the throttle more air is induced through the main body of the carburetor, some of which passes through the slots 42 and causes the valve 36 to rise against the compression of the spring at the bottom of the valve stem 35.

What I claim is:

1. In a carburetor, a body member, an annular channel member forming a fuel chamber within the body member and spaced from said body member to form an air passage, the central portion of the channel member being hollow providing a central air passage, the upper end of the channel member being open to provide a valve seat, an annular valve mounted on the seat and controlling the flow of fuel from the chamber, a primary air conduit connected to the body member below the channel member, means on the valve for causing the fuel to be forced in opposite directions into the central air passage and into the passage between the channel member and the body of the carburetor, an auxiliary air conduit projecting through the channel member and spaced from the inner walls of said member, the upper end of the auxiliary conduit being open and provided with a valve seat, a spring pressed valve mounted on said last mentioned seat, the lower portion of the auxiliary conduit below the channel member being provided with a slot to admit air from the primary air conduit to the auxiliary air conduit, and a source of fuel in communication with the channel member.

2. In a carburetor, a primary air intake tube, a mixing tube, a body member connecting the intake tube to the mixing tube, an auxiliary air tube located in the body member and having a valve controlled outlet projected into the mixing tube and a slotted portion located in the intake tube for receiving air from the intake tube, a hollow internally threaded boss mounted in the intake tube, the lower end of the auxiliary air tube being threaded into the hollow boss and projecting externally of the intake tube, a lever connected with the projecting end of the auxiliary air tube for rotating said auxiliary air tube and likewise elevating or lowering the valved end of the auxiliary air tube relative to the mixing tube.

3. In a carburetor, a body member, an annular channel member forming a ring shaped fuel chamber centrally disposed within the body member and providing a central and outer passage for air, the upper end of the channel being open, an annular fuel valve mounted on the upper open end of said chamber and having an annular flange depending into the open end of the chamber, a secondary air tube passing through the channel member and adapted to supply air at a point which is above the open end of the chamber, said fuel valve being carried by the tube, and movable with the tube for varying the fuel supply.

4. In a carburetor, a mixing tube, a primary air intake, a body member connecting the mixing tube to the air intake, an annular fuel chamber open at its upper end and located within the said member, said annular fuel chamber providing a central air passage and spaced from the body member to form an outer air passage, an auxiliary air tube mounted in the central air passage of the fuel chamber, a valve for controlling the flow of auxiliary air to the combustible mixture, the auxiliary air tube being extended into the primary air intake and provided with a slot for the admission of air to the auxiliary air tube from the primary air intake, a valve for controlling the open end of the fuel chamber and connected to the auxiliary air tube, means for moving the auxiliary air tube longitudinally of the body member whereby the last mentioned valve will be moved toward or away from the open end of the fuel chamber.

CHARLES EDWARD PALMER.